United States Patent

[11] 3,545,519

[72] Inventors Koichi Kawamura,
  Ichihara-shi,
  Miyoshi Ishikawa, Sakai-shi, and Teruji
  Yoshii, Takatsuki-shi, Sigehiko Sugiyama,
  Kobeshi, and Hiroshi Kato, Osaka, Japan
[21] Appl. No. 845,438
[22] Filed July 28, 1969
[45] Patented Dec. 8, 1970
[73] Assignees Maruzen Oil Company, Ltd.,
  Osaka, Japan, and Kimura Kakoki
  Co., Ltd., Amagasaki-shi, Japan,
  both a corporation of Japan
[32] Priority Aug. 6, 1968
[33] Japan
[31] No. 43/55631

[54] PROCESS AND APPARATUS FOR THE
  TREATMENT OF WASTE SULFURIC ACID
  4 Claims, 1 Drawing Fig.
[52] U.S. Cl. .................................................. 159/17,
  159/20, 159/47; 137/567
[51] Int. Cl. ................................................... B01d 1/26,
  B01d 1/100
[50] Field of Search ...................................... 23/274,
  276, 307, 306, 167, 172; 159/17, (Dec.), (acid),
  47, 47(WL), 20; 103/111(D); 203/12; 137/567

[56] References Cited
UNITED STATES PATENTS
| 1,611,534 | 12/1926 | Krafft | 23/172 |
| 2,739,044 | 3/1956 | Ashley et al. | 23/302 |
| 2,078,088 | 4/1937 | Mantius et al. | 23/306 |
| 2,750,894 | 6/1956 | Thomas et al. | 103/111X |
| 3,294,650 | 12/1966 | Manteufel. | 23/172X |

FOREIGN PATENTS
| 941,746 | 11/1963 | Great Britain | 23/172 |
| 309,834 | 4/1929 | Great Britain | 23/172 |

Primary Examiner—Norman Yudkoff
Assistant Examiner—J. Sofer
Attorney—Karl W. Flocks ABSTRACT: A process and apparatus for continuously recovering sulfuric acid in a high concentration of 75 to 85 percent by weight from a waste sulfuric acid which has been used as a catalyst, solvent or dehydrating agent in various organic synthetic reactions in the field of petroleum and chemical industries. The process comprises filtering off the impurities from the waste sulfuric acid, degassing and subsequently forcing the waste sulfuric acid to successively flow into a $H_2SO_4$-sealed system, followed by a stepwise vacuum concentration.

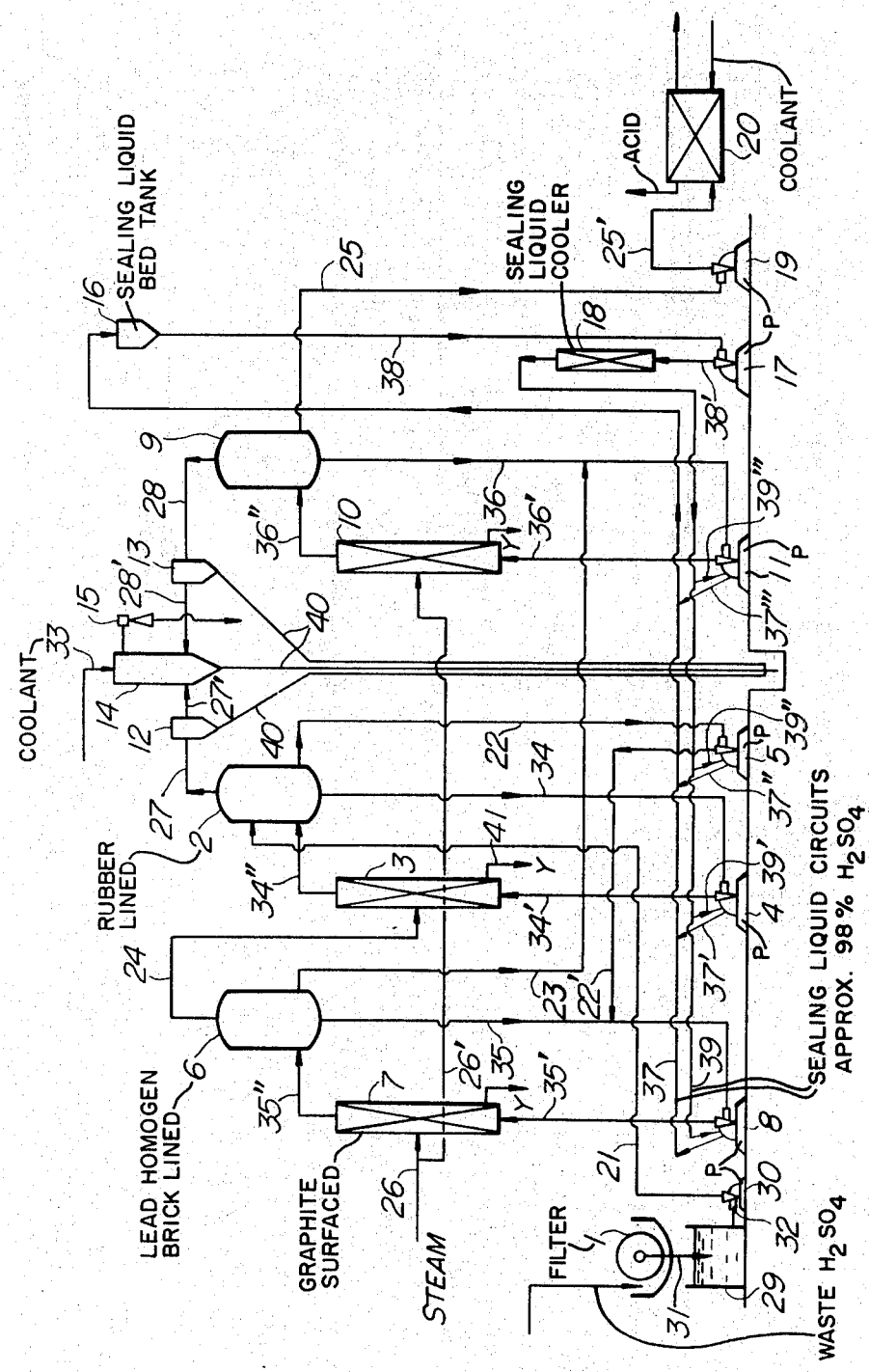

PROCESS AND APPARATUS FOR THE TREATMENT OF WASTE SULFURIC ACID

This invention relates to a process and apparatus for the recovery of waste sulfuric acid. More particularly, this invention relates to the recovery of sulfuric acid from a waste liquid from the various processes in the field of petroleum and chemical industries.

Regarding the concentration of sulfuric acid to a high degree, only the following processes have heretofore been known as seen from "Ryusan Kogyo Binran" (Handbook of Sulfuric Acid Industry) published in 1951.

1. Sulfuric acid concentration by the Pauling process (A sulfuric acid concentration vessel is employed.)
2. Cascade type sulfuric acid concentration (The sulfuric acid, which drops into a dish or beaker, is countercurrently heated from below.)
3. Chemico Drum type sulfuric acid concentration (A large quantity of hot gas heated to 600 to 700° C. is blown directly onto the surface of liquid.)
4. Simonson-Mantius vacuum concentration (The liquid is collected in an evaporator and subjected to evaporation in vacuo.)

All of these conventional processes as mentioned above are carried out by batch type, rather than continuous, operations. These operation suffer from the usual deficiencies of batch operations and are extremely inefficient. In addition, due to sulfuric acid sludge produced from organic synthesis, and impurities other than sulfuric acid, e.g. unaltered raw materials, there is a great difficulty in selecting economical and anticorrosive materials. There are also the faults that heat efficiency is extremely low, and the apparatus is damaged in a short time due to corrosion therefore efficiency is rapidly decreased.

Sulfuric acid of high concentration of 75 to 85 percent by weight is used in various organic synthetic reaction in the field of petroleum and chemical industries. For example, such concentrated sulfuric acid is used as a catalyst or solvent in reactions such as hydration of an olefin (in which propylene, butylene, isobutylene, amylene or the like is absorbed by sulfuric acid and the resulting product is hydrolyzed); carboxylation of an olefin, alcohol, paraffin, ester, ether, mercaptan or the like (in which an olefin or the like is reacted with carbon monoxide in the presence of sulfuric acid and the resulting product is diluted with water); separation of a xylene isomer from xylene mixtures (in which for example, only m-xylene in the mixtures is selectively sulfonated with sulfuric acid followed by separation of the resulting product, whereupon the separated product is hydrolyzed to separate m-xylene); decomposition of cumene hydroperoxide (in which the decomposition is conducted in sulfuric acid); polymerization of olefins (in which, for example, isobutylene is polymerized in the presence of sulfuric acid); and alkylation by reacting an olefin with a paraffin, benzene or the like (in which, for example, isobutane is reacted with olefin in the presence of sulfuric acid to produce gasoline; or olefin is reacted with benzene to produce alkylbenzene). In addition, concentrated sulfuric acid is widely used as a treating agent for the refining of petroleum fractions and as a dehydrating or drying agent. The waste sulfuric acid from the various uses as mentioned above contain impurities, such as acid sludge, polymers, reaction products or the like.

The aforementioned conventional batch processes for the concentration of sulfuric acid are, furthermore, not always adaptable to the treatment of the waste sulfuric acid obtained from various organic synthetic reactions in the field of petroleum and chemical industries.

This invention resides in a new and novel process and apparatus for continuously recovering for reuse concentrated sulfuric acid from waste liquid containing impure sulfuric acid. The present invention is principally directed to start from such waste liquid containing acid sludge and organic carbonaceous materials, as impurities.

It is an object of the present invention to provide an improved sulfuric acid recovery operation which overcomes defects of the prior art, such as indicated above.

The accompanying drawing is a schematic flow diagram of a preferred example of a system which is suitable for carrying out the present invention.

Referring to the drawing; a waste sulfuric acid which is obtained in the petroleum and chemical industries and has a concentration of 30 to 40 percent by weight is passed through an appropriate filter 1, such as an Oliver filter, in which solid impurities including the acid sludge, polymers, reaction products or the like are removed by filtration.

After removing the impurities the liquid is withdrawn via a line 31 into a filtrate reservoir 29. The collected filtrate is passed through a line 32 by the action of a pump 30, and then through a line 21 into a rubber lined evaporator 2, here designated as the evaporator of a second effective vessel system. The top of the evaporator 2 communicates with a condenser 14 through a line 27, a device 12 for preventing countercurrent flow and a line 27'. Owing to the condensing action of cooled water which enters the condenser 14 from a duct 33 as well as the sucking action of an ejector 15, the pressure in the interior of the evaporator 2 is reduced to 20 to 50 mmHg.

The evaporator 2 is provided with a circulative heating channel which comprises a line 34, a circulation forcing pump 4, a line 34', a multipipe type heating vessel 3 having a heat transferring surface made of impervious graphite and a line 34''. The liquid passed into the evaporator 2 is heated to about 55—60° C. while circulating through the circulative heating channel and is thereby concentrated to a sulfuric acid concentration of 45 to 50 percent by weight in such evaporator 2. Under these conditions, the usual lowering of efficiency which is due to the adhesion of scales and the corrosion does not occur, even when the evaporator 2 is lined with rubber and the heat transferring surface of the heating vessel 3 is made of impervious graphite.

The vapor evolved in the evaporator 2 is accompanied by the impure gases evolved from the liquid by the reduced pressure operation. These impure gases, which are condensed to liquid in the condenser 14, are withdrawn through the line 27, the countercurrent preventing means 12 and the line 27' to discharge lines 40. The uncondensed gases are sucked and discharged by means of the ejector 15. The provision of the countercurrent preventing means 12 between the evaporator 2 and the condenser 14 can prevent the countercurrent flow of the cooled water from the condenser 14 which is caused by the fluctuation of the operation condition. Thus, the danger that the cooled water would violently react with the sulfuric acid retained in the evaporator 2 to evolve reaction heat, thereby causing the damage of the apparatus is avoided. As a result, the safe operation of the system is insured.

After being degassed and concentrated in the evaporator, the sulfuric acid liquid is passed through a line 22, a pump 5 and a line 22' to a first effect vessel system. The first effect vessel system consists of a lead homogen bricklined evaporator 6 and a circulative heating channel comprising a line 35, a circulation forcing pump 8, a line 35', a multipipe type heating vessel 7 having a heat transferring surface made of impervious graphite, and a line 35''.

The liquid passed to the first effect vessel system is heated while circulating through the line 35, the pump 8, the line 35', the heating vessel 7 and the evaporator 6, and gases therefrom are evaporated in the evaporator 6. The heating vessel 7 is heated by live steam led through a line 26. the evolved vapor from the evaporation 6 is led through a line 24 and is used as a heating vapor for the heating vessel 3; here to the vapor is condensed and the liquid is discharged through a line 41. Such condensation causes the pressure in the interior of the evaporator 6 to be reduced to 350 to 400 mmHg and, at the same time, the sulfuric acid liquid is heated to 110 to 120° C. and concentrated to 60 to 65 percent by weight. In this instance, the evolved vapor is no longer accompanied by impure gases. Therefore, when the evolved vapor is led through the line 24 into the heating vessel 3, the corrosion of the heat transferring surface thereof will not occur. In addition, because of the vacuum saturation temperature in the evaporator 6, the evolved vapor is sufficiently utilized as a heat source for the heating vessel 3 in which the temperature is 55 to 60° C. Under the above-mentioned temperature and concentration condition, the lead homogen bricklining of the evaporator 6 as well as the impervious graphite-made heat transferring surface of the heating vessel is allowable. In this case, there is almost no possibility of the occurence of adhesion of scales as well as the corrosion in the heating vessel.

The liquid concentrated in the evaporator 6 is subsequently led through a line 23 to a liquid finishing system which consists circulatively of an evaporator 9 of which the degree of vacuum is regulated to 20 to 50 mmHg, a line 36, a circulation forcing pump 11, a line 36', a multipipe type heating vessel 10 and a line 36''. The liquid passed to the system is concentrated therein to 75—85 percent by weight and heated to 120 to 150° C. The heating vessel 10 is heated by live steam led through a line 26'. In this case, owing to the temperature and concentration conditions as mentioned above, the evaporator 9 may be lined with a cast iron having a high silicon content, and the heating vessel 10 may have a heat transferring surface made of impervious graphite which can be used without danger of occurence of adhesion of scales as well as corrosion under these conditions.

The top of the evaporator 9 communicates with the condenser 14 through a line 28, a countercurrent preventing means 13 and a line 28'. By the action of the ejector 15 the pressure in the interior of the evaporator is reduced. The sulfuric acid liquid concentrated in the evaporator 9 is then discharged by the action of a pump 19 through lines 25 and 25' into a cooler 20, in which the concentrated liquid is cooled to about 30 to 40° C. so that it may be continuously reused.

According to the present invention, the sealing liquid portions of the mechaseals, of the pumps 4, 5, 8 and 11 are provided with an airtight circulation channel for high concentration sulfuric acid (about 98 percent). Stated illustratively, there is a sealing liquid circulation channel consisting of the pump 8, a line 37, a sealing liquid bed tank 16, a line 38, a pump 17, a line 38', a sealing liquid cooler 18 and a line 39. Besides, there is a channel consisting of the line 37, the line 39, and a branched line 39', the pump 4 and a branched line 37'; a channel consisting of the lines 37 and 39, a line 39'', the pump 5 and a line 37''; and a channel consisting of the lines 37 and 39, a line 39''', the pump 11 and a line 37'''.

As stated above, substantially all gases are previously removed before the waste sulfuric acid solution is subjected to evaporation treatment. The gases produce corrosive materials at high temperature. Therefor, there is no danger of evolving undesirable gasses in the subsequent processing. The present process is carried out at a low temperature, such as under 150° C. Therefore, the evaporators have only a to be lined with economical materials specified above and the multipipe type heating vessels may have heat transferring surfaces made of economical material i.e. impervious graphite.

Enforced circulation is needed, because a high concentration of sulfuric acid containing material is used. By such circulation, little scale is deposited on the heat transferring surface and no drop is caused in heat transferring efficiency.

In the apparatus of this invention pumps are employed to provide the vacuum system, and a leak of the mechaseals in the vacuum system is effected from the sealing liquid side to the circulating liquid side. If water were employed as a sealing liquid, there would be danger that the water would leak to the circulating liquid side thereby tending to cause not only the damage of the constituent material of the mechaseal portion but also the explosion in the pump. In order to avoid such danger, according to the present invention, there is employed sulfuric acid of high concentration, for example 98 percent, as a sealing liquid. In this way, even when a leak of the mechaseal occurs, the high concentration sulfuric acid is mixed into the sulfuric acid (85 percent or less) in the evaporation concentrating system. In this case, the reaction heat is extremely small. Therefore, there is no danger to damage the constituent materials of the mechaseal and pump. Furthermore, it is noted that there is no danger to the exterior because, as a sealing liquid of the mechaseal portions, a high concentration sulfuric acid is circulated in an airtight manner. Moreover, since the concentration is recognized to be approximately constant, it is unnecessary to particularly increase the amount used.

EXAMPLE

An effluent waste liquid, obtained from the bottom of the stipper for separating the product from sulfuric acid in the process for the preparation of secondary butyl alcohol wherein butylene is absorbed by sulfuric acid followed by hydrolysis, was subjected to the treatment. The effluent waste liquid contained 38 percent by weight of sulfuric acid and about 2 percent by weight of $C_4$-polymer hydrocarbon. The waste liquid was filtered at a rate of 11,050 Kg/hr. to remove $C_4$-polymer hydrocarbon and the other solid impurities. Subsequently, the waste liquid was continuously passed to the second effect vessel system in which the waste liquid was subjected to evaporation. In this instance, by regulating the degree of vacuum in the evaporator 2 to 50 mmHg, the waste was concentrated to 50 percent by weight sulfuric acid having a temperature of 60° C. The evaporated amount was 2,650 Kg/hr., and the secondary butyl alcohol dissolved in the waste liquid was simultaneously liberated. Under such condition as mentioned above, the inner surface of the rubberlined evaporator 2 and the impervious graphite-made heat transferring surface of the heating vessel 3 stood long-period use without any corrosion. As the circulation forcing pump 4 was used, any adhesion of scale to the heat transferring surface was not observed is long period and heat transfer was effective. Moreover, by sealing 98 percent sulfuric acid in the pump 4, there was no danger due to the leak of the sealing liquid.

Subsequently, the firstly concentrated liquid was continuously passed at a rate of 8,400 Kg/hr. To the first effect vessel, system, in which the concentration was effected at a degree of vacuum of 375 mmHg to obtain a concentrated liquid having a temperature of 120° C. and a sulfuric acid concentration of 60 percent by weight. The evaporated amount was 1,400 Kg/hr. Under such condition as mentioned above, the inner surface of the lead homogen bricklined evaporator 6 and the impervious graphite-made heat transferring surface of the heating vessel 7 stood long-period use without any corrosion. As the circulation forcing pump 8 was employed any adhesion of scale to the heat transferring surface was not observed in long-period and heat transfer was effective. Moreover, by sealing 98 percent sulfuric acid in the pump 8, there was no danger due to the leak of the sealing liquid.

As the evolved vapor from the evaporator 6 was not accompanied by impure gases, the evolved vapor was utilized as a heating vapor for the heating vessel 3 of the first concentrating system in which the operation was conducted at a temperature lower than that of the evaporator 6, without any danger of corrosion of the heat transferring surface.

After the second concentration, the liquid was continuously passed to the liquid finishing system, in which the concentration was effected at a degree of vacuum of 50 mmHg to obtain a concentrated liquid having a temperature of 128° C. and a sulfuric acid concentration of 80 percent by weight. Under such condition as mentioned above, the inner surface of the high silicon content-cast iron made evaporator 9 and the impervious graphite-made heat transferring surface of the heating vessel 10 stood long-period use without any corrosion. As the circulation forcing pump 11 was employed, any adhesion of scale to the heat transferring surface was not observed for long period and heat transfer efficiency was kept constant. Moreover, by sealing 98 percent sulfuric acid in the pump 11, there was no danger due to the leak of the sealing liquid.

The finished liquid, obtained at the rate of 5250 Kg/hr., was cooled to 40° C. in the cooler 20, and continuously reused.

We claim:
1. A process for the treatment of a waste sulfuric acid obtained in the petroleum and chemical industries which comprises:
   continuously filtering solid matters from the waste sulfuric acid;
   continuously concentrating the waste sulfuric acid to a sulfuric acid concentration of 45 to 50 percent by weight under a reduced pressure of 20 to 50 mmHg, while simultaneously removing volatile matters by degassing;
   further continuously concentrating the resulting 45—50 percent concentrated waste sulfuric acid to a sulfuric acid concentration of 60 to 65 percent by weight under a reduced pressure of 350 to 400 mmHg; and
   and still further continuously concentrating the resulting 60—65 percent concentrated waste sulfuric acid to a sulfuric acid concentration of 75 to 85 percent by weight under a reduced pressure of 20 to 50 mmHg.

2. An apparatus for the treatment of a waste sulfuric acid which comprises a filter; means to heat and concentrate the filtrate downstream from said filter comprising a second effect vessel system including a circulation channel consisting of a rubberlined evaporator, means to reduce the inner pressure to 20 to 50 mmHg, a circulation forcing pump with a mechaseal having a high concentration sulfuric acid as a sealing liquid and a multipipe type heating vessel having a heat transferring surface made of an impervious graphite; means to further heat and concentrate said filtrate downstream from said second effect vessel system comprising a first effect vessel system including a circulation channel consisting of a lead homogen bricklined evaporator, means to reduce pressure therein to 350 to 400 mmHg, a circulation forcing pump with a mechaseal having a high concentration sulfuric acid as a sealing liquid and a multipipe type heating vessel having a heat transferring surface made of an impervious graphite; means to further heat and concentrate said filtrate downstream from said first effective vessel system comprising a liquid finishing system including a circulation channel consisting of an evaporator made of a cast iron having a high silicon content, means to reduce the internal pressure thereof to 20 to 50 mmHg, a circulation forcing pump with a mechaseal having high concentration sulfuric acid as a sealing liquid and a multipipe type heating vessel having a heat transferring surface made of an impervious graphite; and a cooler.

3. An apparatus as claimed in claim 2, wherein the mechaseal portion of the circulation forcing pump is provided with a circulation channel for high concentration sulfuric acid.

4. An apparatus as claimed in claim 2, wherein a countercurrent preventing means in is provided intermediately between the evaporator and a condenser.